(12) United States Patent
Hancock (10) Patent No.: US 10,888,073 B1
(45) Date of Patent: Jan. 12, 2021

(54) BAIT

(71) Applicant: RMB Importing, LLC, Fort Atkinson, WI (US)

(72) Inventor: Robin Hancock, Elkhorn, WI (US)

(73) Assignee: RMB Importing, LLC, Fort Atkinson, WI (US)

( * ) Notice: Subject to any disclaimer, the term of this patent is extended or adjusted under 35 U.S.C. 154(b) by 0 days.

(21) Appl. No.: 16/816,744

(22) Filed: Mar. 12, 2020

(51) Int. Cl.
*A01K 85/01* (2006.01)
*A01K 85/16* (2006.01)

(52) U.S. Cl.
CPC .............. *A01K 85/01* (2013.01); *A01K 85/16* (2013.01)

(58) Field of Classification Search
CPC ......... A01K 85/00; A01K 85/02; A01K 85/16
USPC ........................................................ 43/42.31
See application file for complete search history.

(56) References Cited

U.S. PATENT DOCUMENTS

| | | | | |
|---|---|---|---|---|
| 1,583,199 A | * | 5/1926 | Taylor | A01K 85/16 43/42.3 |
| 2,250,478 A | * | 7/1941 | Franks | A01K 85/16 43/42.3 |
| 2,575,797 A | * | 11/1951 | Corsi | A01K 85/02 43/42.3 |
| 2,749,646 A | * | 6/1956 | Hall | A01K 91/02 43/42 |
| 3,105,317 A | * | 10/1963 | Fox | A01K 85/16 43/26.2 |
| 3,750,321 A | | 8/1973 | McClellan | |
| 3,855,722 A | | 12/1974 | Moore | |
| 3,881,272 A | | 5/1975 | Parker | |
| 3,909,974 A | | 10/1975 | Kent | |
| 4,045,903 A | | 9/1977 | Parker | |
| 4,712,326 A | | 12/1987 | Hoover et al. | |
| 4,785,569 A | | 11/1988 | Thomas, Jr. | |
| 4,791,750 A | | 12/1988 | Gammill | |
| 4,807,383 A | | 2/1989 | Delwiche | |
| 4,858,370 A | * | 8/1989 | Ryder | A01K 85/00 43/43.13 |
| 5,131,181 A | * | 7/1992 | Steinke | A01K 85/00 43/42.28 |
| 5,546,694 A | * | 8/1996 | Wilkinson | A01K 85/16 43/42.31 |
| 5,588,246 A | | 12/1996 | Hill | |
| 5,806,234 A | | 9/1998 | Nichols | |
| 5,918,405 A | | 7/1999 | Marusak et al. | |
| 5,926,993 A | | 7/1999 | Marusak et al. | |
| 5,926,994 A | | 7/1999 | Mason et al. | |

(Continued)

FOREIGN PATENT DOCUMENTS

FI 61388 1/1982

OTHER PUBLICATIONS

Article on Jackall lure, by Wollbugger, Sep. 2, 2014 http://www.tackletour.com/reviewjackalliobee.html.*

(Continued)

*Primary Examiner* — Christopher P Ellis
(74) *Attorney, Agent, or Firm* — Shane Delsman; Godfrey & Kahn, S.C.

(57) ABSTRACT

A fishing bait having a body with at least one hook. The fishing bait may have one or more keels on the bottom side of the body. The hooks of the bait may be pointed upward and located in pockets formed in the body. The fishing bait may include a tube extending through the body with a noise making element within the tube.

10 Claims, 10 Drawing Sheets

(56) References Cited

U.S. PATENT DOCUMENTS

| | | | |
|---|---|---|---|
| 5,946,847 A | 9/1999 | North | |
| 6,061,948 A | 5/2000 | Boucek | |
| 6,212,818 B1 | 4/2001 | Huddleston | |
| 6,651,376 B1 | 11/2003 | Link | |
| 6,675,526 B1 * | 1/2004 | Baron | A01K 85/16 43/42.36 |
| 6,865,842 B2 | 3/2005 | Brinkman | |
| 7,614,178 B2 | 11/2009 | Hoyt | |
| 7,827,730 B1 | 11/2010 | Jensen et al. | |
| 8,037,635 B1 * | 10/2011 | Wyatt | A01K 85/00 43/42.15 |
| 8,091,271 B2 * | 1/2012 | Mayer | A01K 85/16 43/42.09 |
| 8,316,576 B1 | 11/2012 | Brown | |
| 8,601,737 B2 | 12/2013 | Beer et al. | |
| 8,910,415 B2 | 12/2014 | Farr, Jr. | |
| 9,173,385 B2 | 11/2015 | Cooper et al. | |
| 9,474,257 B1 * | 10/2016 | McGilvry | A01K 85/02 |
| 10,244,741 B1 * | 4/2019 | Hancock | A01K 85/16 |
| D858,685 S * | 9/2019 | Koppers | D22/133 |
| 10,575,506 B2 | 3/2020 | Hancock | |
| 2005/0223620 A1 | 10/2005 | Pixton | |
| 2006/0042147 A1 | 3/2006 | Jenkins | |
| 2006/0075678 A1 * | 4/2006 | Schammel | A01K 97/04 43/42.09 |
| 2006/0260178 A1 * | 11/2006 | Jones | A01K 91/04 43/42.36 |
| 2008/0083154 A1 * | 4/2008 | Gregory | A01K 83/00 43/44.8 |
| 2009/0113783 A1 | 5/2009 | Hollomon | |
| 2009/0183418 A1 * | 7/2009 | Dahlberg | A01K 85/00 43/42.3 |
| 2009/0277071 A1 | 11/2009 | Harris, Jr. | |
| 2009/0307960 A1 * | 12/2009 | Oelerich, Jr. | A01K 85/00 43/42.24 |
| 2010/0000145 A1 * | 1/2010 | Leppala | A01K 85/01 43/42.31 |
| 2010/0229453 A1 | 9/2010 | Cunningham | |
| 2010/0263259 A1 * | 10/2010 | Cuthbert | A01K 85/08 43/42.25 |
| 2013/0051779 A1 * | 2/2013 | Londeree | A01K 97/00 396/25 |
| 2013/0074395 A1 * | 3/2013 | Farr, Jr. | A01K 85/01 43/42.31 |
| 2013/0081319 A1 * | 4/2013 | Scott | A01K 85/00 43/42.03 |
| 2013/0152450 A1 | 6/2013 | Myerson et al. | |
| 2013/0318858 A1 * | 12/2013 | Cook, Jr. | A01K 85/16 43/42.22 |
| 2014/0013648 A1 * | 1/2014 | Yong-Set | A01K 85/02 43/42.41 |
| 2014/0115944 A1 * | 5/2014 | Thomas | A01K 85/01 43/4.5 |
| 2014/0317992 A1 * | 10/2014 | Morgan | A01K 85/08 43/42.49 |
| 2015/0373959 A1 * | 12/2015 | Morgan | A01K 93/00 43/42.49 |
| 2016/0007581 A1 * | 1/2016 | Davidson | A01K 85/01 43/17.1 |
| 2016/0113257 A1 | 4/2016 | Harrington | |
| 2016/0157471 A1 * | 6/2016 | Leppala | A01K 85/16 43/42.22 |
| 2018/0000058 A1 * | 1/2018 | Jarboe, Jr. | A01K 85/18 |
| 2018/0042206 A1 | 2/2018 | St John | |
| 2018/0360011 A1 * | 12/2018 | Fletcher | A01K 83/02 |
| 2018/0360013 A1 * | 12/2018 | Breunig | A01K 91/08 |
| 2019/0000052 A1 * | 1/2019 | Garman | A01K 85/16 |
| 2019/0008128 A1 | 1/2019 | Walsh | |

OTHER PUBLICATIONS

Website screenshot; https://www.youtube.com/watch?v=ghdWBcj2rYo; ICAST 2009—Snag Proof Ish's Phat Frog; Oct. 23, 2009.

Website screenshot; https://www.booyahbaits.com/lures/frogs; BOOYAH Hollow Body Frogs; Mar. 6, 2020.

Website screenshot; https://zoombait.com/2019/09/zoom-releases-new-hollow-body-frog; Zoom releases new Hollow Body Frog; Mar. 6, 2020.

http://web.archive.org/web/20120109072551/http://www.basspro.com/Bass-Pro-Shops-Tourney-Rattle-Bait/product/10225063/; website screenshot for the Bass Pro Shops Tourney Rattle Bait; Jan. 9, 2012.

http://web.archive.org/web/20150923000105/http://www.fleetfarm.com/detail/southern-pro-tackle-rattle-eye-jig-orange/000000090151; website screenshot for the Southern Pro Tackle Rattle Eye Jig Orange; Sep. 23, 2015.

https://allsharktankproducts.com/shark-tank-products-sports/the-world-record-striper-company-fishing-lures-and-tackle/; website screenshot for the Fishing Lures and Tackle; May 19, 2015.

* cited by examiner

FIG. 10

BAIT

FIELD OF THE INVENTION

The present invention relates generally to the field of fishing. More particularly, the present invention relates to the field of baits.

BACKGROUND

Baits are used by fishing hobbyists and professionals to catch fish. Baits can be live, e.g. real fish, worms, frogs, etc. or artificial, which are made to look like or imitate live bait. Artificial baits come in a wide variety of shapes, sizes and configurations and can be relatively inexpensive. Further, artificial baits are versatile in that they can be tailored to attract a particular type of fish by changing one or more characteristics, for example, the shape or size.

One characteristic that may attract a fish is how lifelike the artificial baits appear to a fish, e.g. moving eyes. One aspect of a lure that can make the lure appear lifelike is the sound and/or vibrations it makes. Some prey or bait, e.g. invertebrates, sought after by fish, e.g. bass, make sounds and vibrations in the water that fish use to locate such prey. Some lures use rattles to mimic the sound and vibrations created by such prey to attract the sought-after fish.

One attempt to create a lifelike eye in the fishing industry, as seen in U.S. Pat. Nos. 10,575,506 and 10,244,741, by the inventor and owned by the owner of the present application, which are hereby incorporated herein for all purposes, was to use one or more balls in an enclosed housing. As the lure moves in the water, the ball(s) move from one side of the housing to the other creating a life-like appearance and a clicking sound as they contact each other and the housing.

It will be understood by those skilled in the art that one or more aspects of this invention can meet certain objectives, while one or more other aspects can lead to certain other objectives. Other objects, features, benefits and advantages of the present invention will be apparent in the summary and descriptions of the disclosed embodiment(s), and will be readily apparent to those skilled in the art. Such objects, features, benefits and advantages will be apparent from the above as taken in conjunction with the accompanying figures and all reasonable inferences to be drawn therefrom.

DETAILED DESCRIPTION

As shown in FIGS. 1-8, an artificial bait 10 includes a body portion 12 that is shaped to look like a type of live bait, in the example provided, a frog. In the embodiment seen in FIG. 1, the body is a hollow body formed from a spin-molded plastic such as, for example, polyvinylchloride or latex. However, other materials and means for making an artificial bait are known in the industry and the use of which would not defeat the spirit of the invention. The bait 10 can also include a hook 14 and line tie or eyelet 16 attached or connected to it. In the embodiment seen in FIG. 3, the hook 14 is a double hook with a first 38 and second points 38'.

Figure 4:
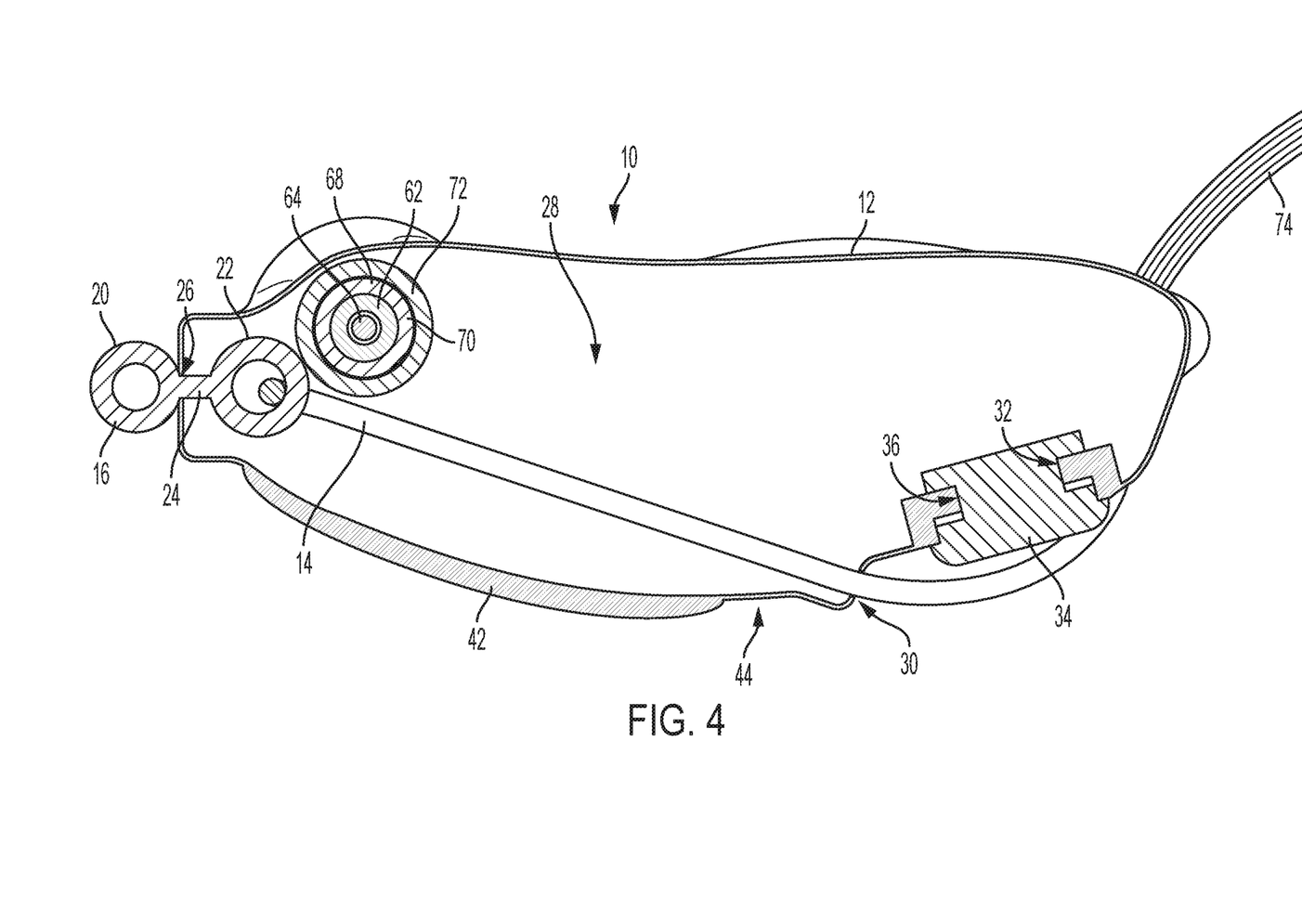
FIG. 4 is a side cross-sectional view of the bait in FIG. 3 taken from the line 4-4.

As seen in the embodiment illustrated in FIG. 4, the eyelet 16 includes a first ring 20 and a second ring 22 connected by a bar 24. The eyelet 16 is attached to the body 12, in the embodiment shown in FIG. 4, by inserting the second ring 22 through a first opening 26 in the body near the head or front. The material forming the body 12 has sufficient resilience such that the first opening 26 can expand to permit the second ring 22 to pass through the first opening 26 and into the interior cavity or hollow space 28 of the body and then contract back around the bar 24. The first opening 26 is sized smaller than the bar 24 such that when the eyelet 16 is attached to the body 12, a sealed is formed around the bar by the body to prevent water from entering the first opening.

Figure 3:
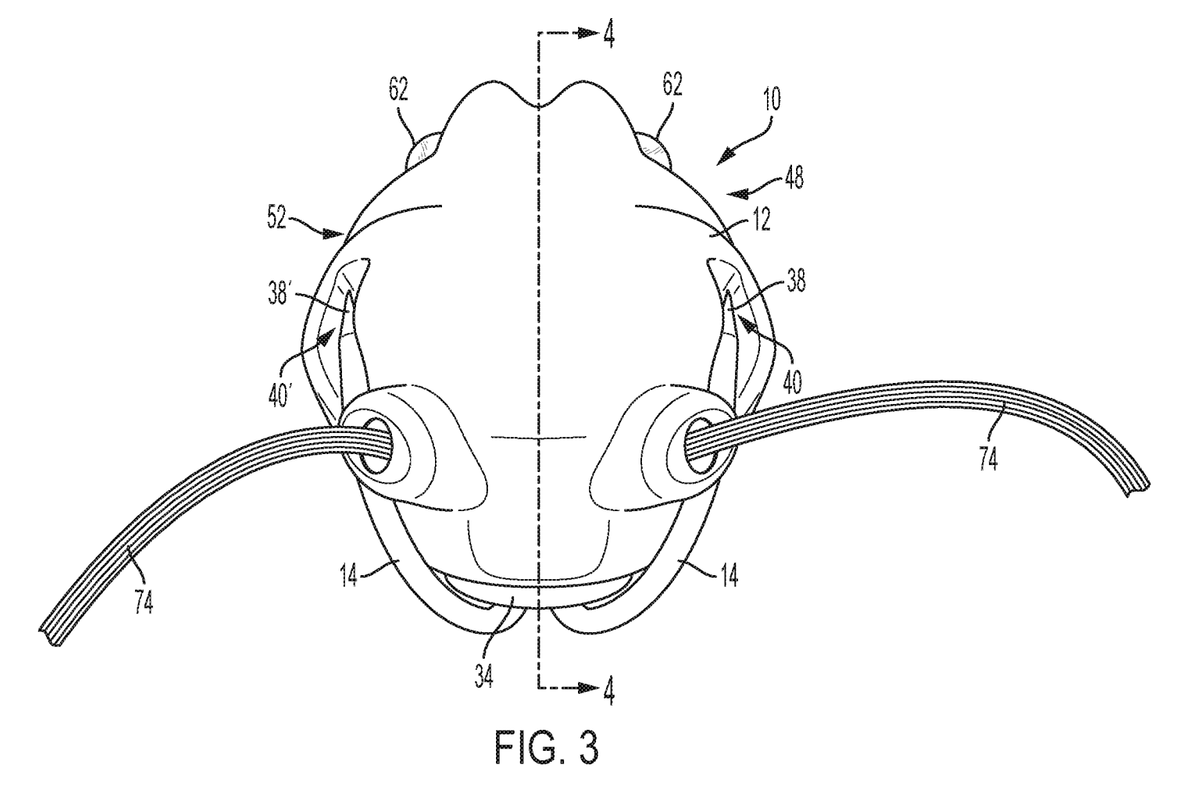
FIG. 3 is a rear perspective view of the bait in FIG. 1.

The double hook 14 may be attached to the artificial bait 10 by extending a first end of the hook through the second ring 22 in the cavity 28 of the hollow member or body 12. This connection or attachment of the hook 14 to the eyelet 16 allows the hook to move and change its angle when a fish strikes such that the tips or points 38 are in position to engage the fish's mouth. However, other means are known in the industry for attaching a hook to an artificial bait. The body includes another opening 30 formed near or on the bottom side of the body 12, and as shown in the embodiment seen in FIG. 4, permits a portion of each of the two hooks to extend out of the cavity 28. The opening 30 does not need to form a seal around the hook 14 because by being located at the bottom of the body 12, the air in the cavity 28 has no way to exit the cavity and thereby prevents the water from entering the cavity. However, other means for permitting a hook or hooks from exiting the body 12 of bait 10 are known in the industry, the use of which would not defeat the spirit of the invention. As seen in FIG. 3, each end of hook 14 exits the opening 30 and extends up and around a side of the body 12.

A second opening 32 can be formed in the body 12 such as to accommodate a weight 34. In the embodiment seen in FIG. 4, the second opening 32 is located at the bottom side and towards the rear or tail of the body 12. The second opening 32 can hold the weight 34 such as, by example, permitting a portion of the weight to enter the cavity 28. Like the first opening 26, the second opening 32 can be sized smaller than the weight 34 such that after permitting a portion of the weight to enter the cavity 28, the third opening can contract back and form a seal around a groove 36 in the weight. The weight 34 could additionally or alternatively be glued to the body 12. The weight helps ensure that after being cast, for example, or after being reeled or pulled, the bottom of the bait is downwards, and the top of the artificial bait is upwards to present a lifelike appearance to a fish.

Current artificial baits, for example frog baits, have a hook or hooks with points that are directed downward, e.g. towards the bottom of the bait, or parallel to the bottom, to prevent the bait from snagging or catching on objects in or around the water, e.g. lily pads, tree limbs, etc. One disadvantage of hook points directed downwards is that when a fish comes up from the water to bite the bait, the points are not in an optimal position to engage the fish's mouth. Thus, the fisherman or woman may not hook the fish.

Figure 1:
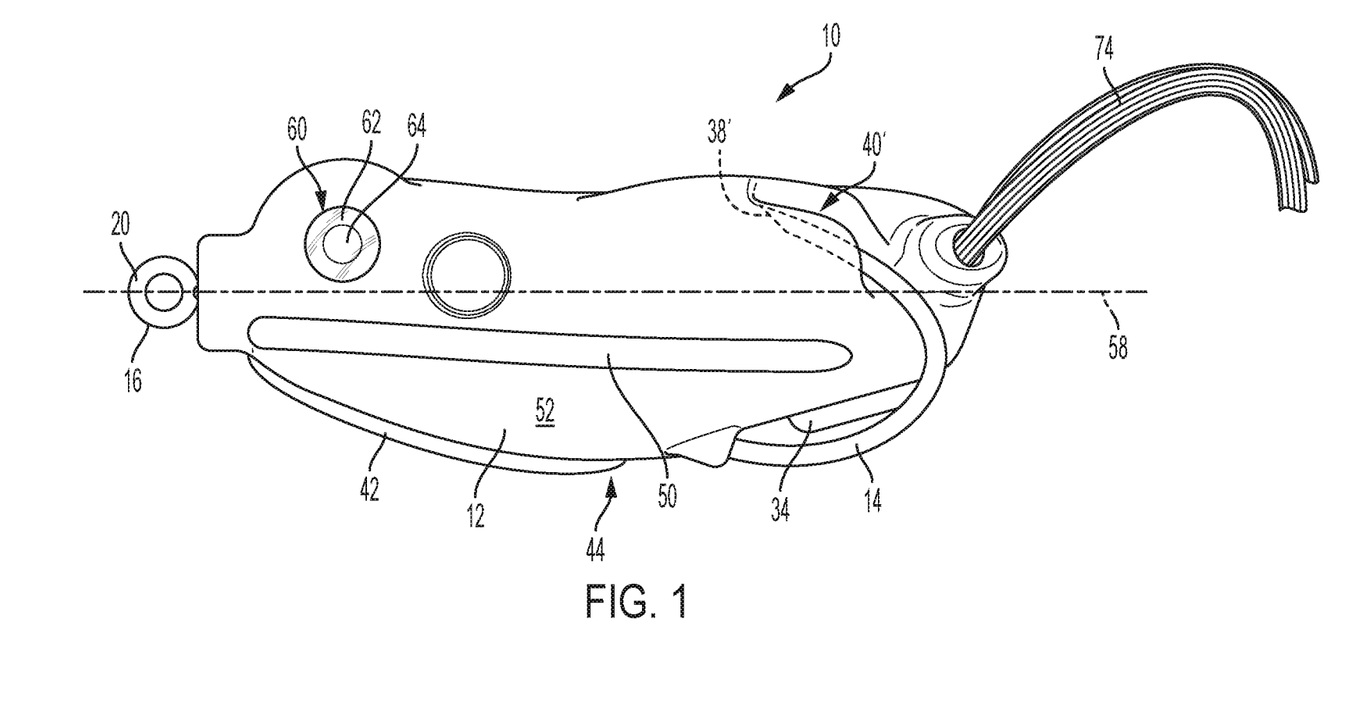
FIG. 1 is a side elevation view of one embodiment of a bait.

In one embodiment of the present invention, such as that seen in FIG. 1, the points 38 of the hook 14 are pointed upwards and towards the front of the bait 10. In order to prevent the points 38 of the hook 14 from snagging or catching on objects in or around the water, the points are located in channels or pockets 40 formed in the topside and exterior surface of the body 12. For example, as seen in FIG. 3, the first tip 38 is located in a first pocket 40 formed in a first side 48 of the body 12 and the second tip 38' is located in a second pocket 40' formed in a second side 52 of the body such that the tips are adjacent a top side of the body 12. The pockets 40, 41' seen in FIG. 3 are located adjacent the rear of the body 12. The pockets 40 reduces the ability for objects such as lily pads from engaging and catching on the points 38 of the hooks 14. However, the resilient nature of the material forming the body 12 permits the body and/or pockets 40 to deform or collapse when a fish bites or strikes the bait 10 exposing the points 38 and permitting the fish's mouth to engage the points 38.

Figure 6:
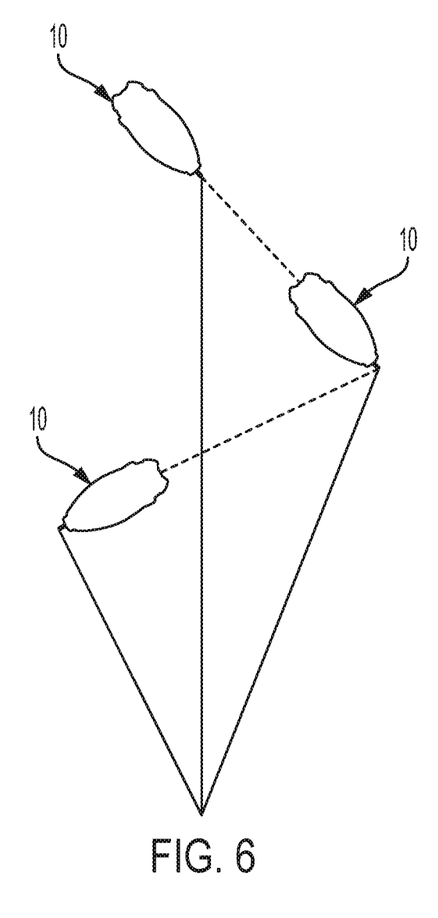
FIG. 6 is a plan view of the bait of FIG. 1 in use.

A number of techniques are used to fish with artificial bait which are known in the industry. One technique is known as "walking" the bait. The technique starts by casting the bait out into or around the water, e.g. on lily pads. The fisherman or woman then points the rod down or towards the water and whips or pulls the tip of the rod back towards him or her while reeling in the line. Because no two whips or pulls are the same, the bait will be pulled and engage the water in a zig-zag manner, as shown in FIG. 6, which is attractive to fish. However, this technique is difficult to perform as it is difficult to get the bait to engage the water such that the bait zigs and zags like that of live bait.

In one embodiment, the body 12 includes one or more keels. The embodiment seen in FIG. 5 includes a first keel 42 located along the center of the underside or bottom side 44 of the body 12, a second keel 46 along a first side 48 of the body and a third keel 50 along a second side 52 of the body. In one embodiment, the keels 42, 46, 50 each have an end adjacent the front of the body 12. The space between the first keel 42 and one of the second keel 46 and third keel 50 creates a first pathway 54 and second pathway 56 respectively for water to flow while the bait is in the water. As the bait 10 is "walked," the water will engage the two pathways 54, 56. In the embodiment seen in FIG. 5, the keels 42, 46, 50 are integrally formed in the exterior surface of the body 12, however keels could be attached in any manner, e.g. glued, welded, fastened, etc., known in the industry, the use of which would not defeat the spirit of the invention.

Figure 5:
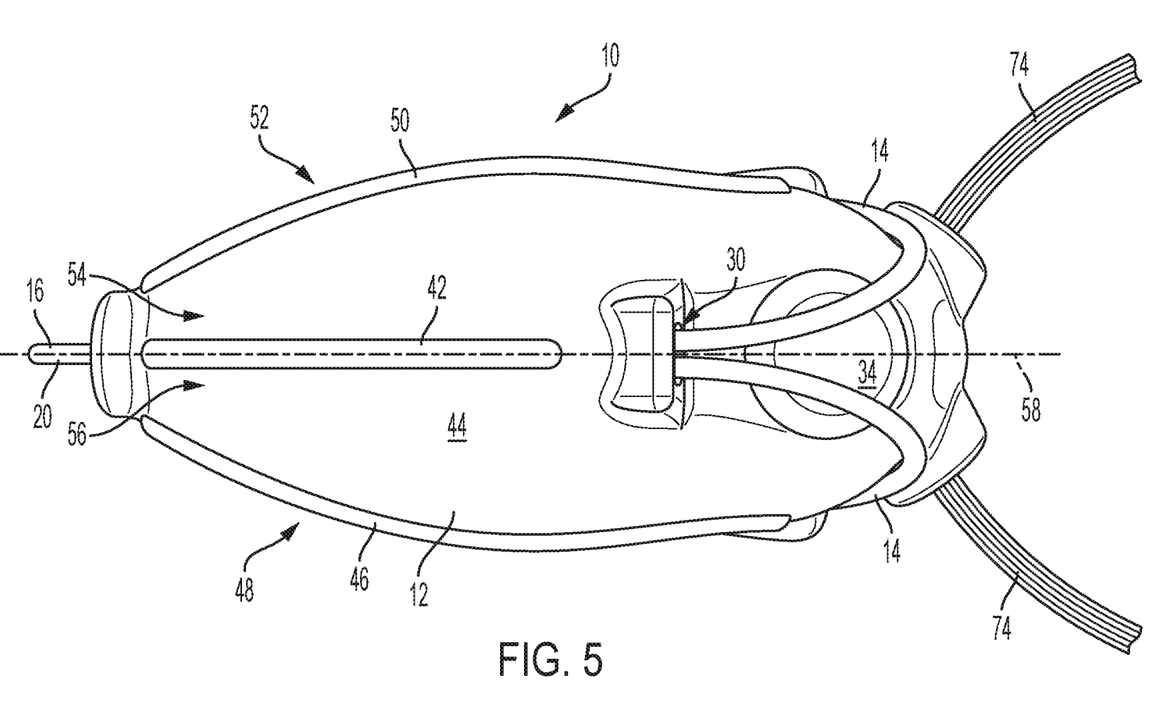
FIG. 5 is a bottom plan view of the bait of FIG. 1.

When a conventional bait is being "walked," the bait will have a tendency to realign its longitudinal axis to be directed at the direction of pull and move towards that direction with little or no zigzagging, unless the fisherman or woman has experience with such technique. Keels 42, 46, 50 help prevent the bait 10 from realigning its longitudinal axis 58 towards the direction of pull and instead promote the bait to move back towards the direction of pull at first angle with a first pull and at a second angle with a second pull to obtain the desired zigzagging. For example, when the pull is from the first side 48 of the body, the first side keel 46 will engage the water more than the second side keel 50 and the bait 10 will move to a position on the first side of the body.

Figure 2:
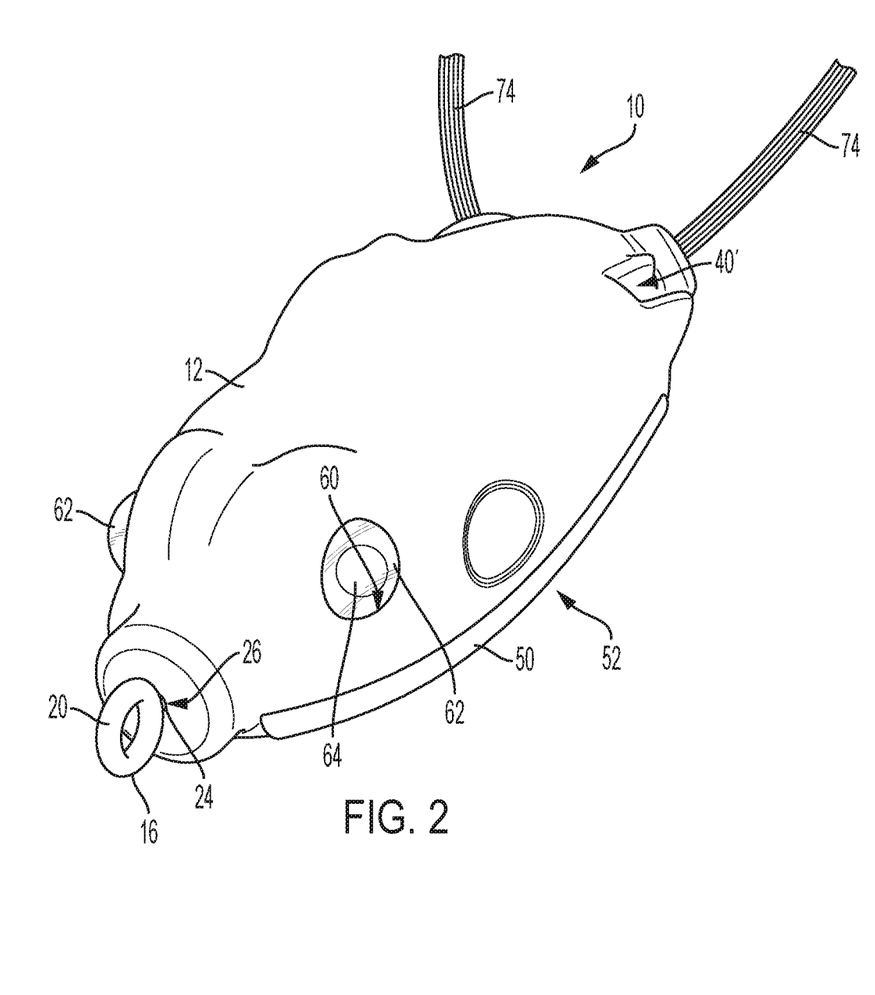
FIG. 2 is a side perspective view of the bait in FIG. 1.
Figure 7:
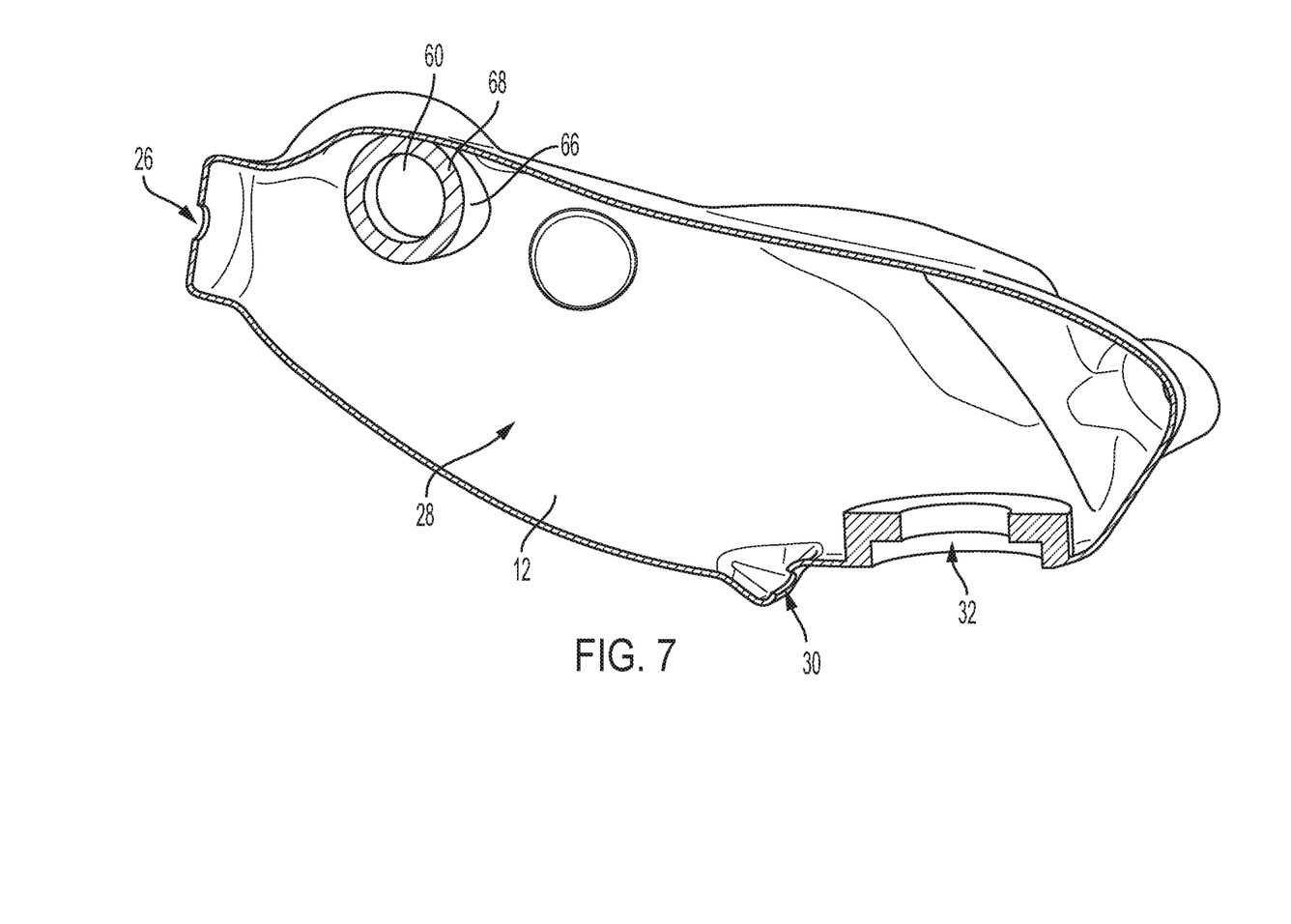
FIG. 7 is a side perspective cross-sectional view of the body of the bait in FIG. 4.

As discussed above, one embodiment includes a moving eye such as that taught in U.S. Pat. Nos. 10,575,506 and 10,244,741. The body 12 as seen in FIG. 7 has a hole or bore 60 formed therein in the general location of where an eye would be of the live bait which the artificial bait 10 is attempting to mimic. A tube 62 is located or positioned in the hole 60. As seen in FIG. 2, the tube 62 extends from a first side of the body 12 to the second side of the body. The tube 62 can include one or more noise making elements 64, e.g. balls or ball bearings, located in the tube that make a noise and vibration when they contact each other and/or the tube. The tube 62 may be made from a material that permits light through the material such that at least one ball 64 is visible through the tube when the at least one ball is located near one of the first end and second end of the tube.

The body 12 forms a seal around the tube 62 to prevent water from entering the body 12 and causing the bait 10 not to perform as desired. In one embodiment the hole 60 is sized smaller than the tube 62 such that the resilient nature of the material forming the body permits that hole to expand to receive the tube, but then contracts back to contact the tube.

Alternatively or additionally, the body 12 may have a third opening 60 formed therein on a first side 48 of the body to permit access to the cavity 28 and the body may have a fourth opening 60' formed on the second side 52 opposite the first side to permit access to the cavity.

A shoulder 66 may be formed as part of the body 12 around each of the openings 60, 60' in the cavity 28. As seen in FIG. 7, one embodiment of the shoulder 66 is a cylinder with a hole that aligns with the openings 60, 60' from the first 48 and second side 52 of the body. The end of the shoulder 66 incudes a bearing surface 68.

Figure 8:
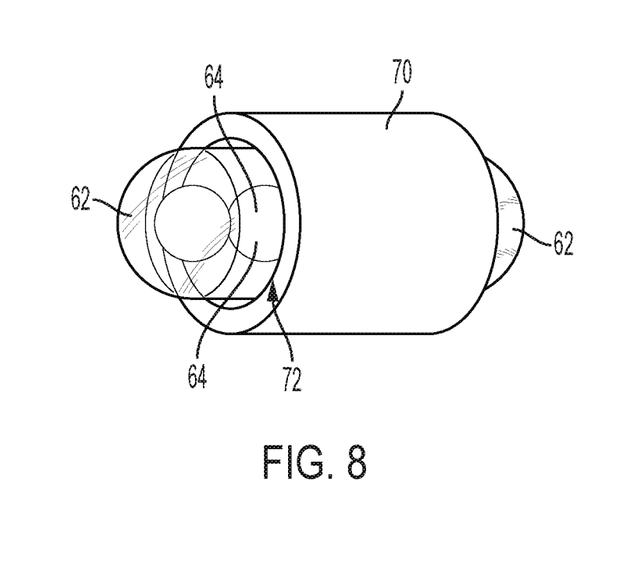
FIG. 8 is a side perspective view of the tube in the sleeve.

The tube 62 shown in FIG. 8 may be positioned at least partially through or located in a sleeve 70. The sleeve 70 is shaped as a cylinder with each end of the cylinder having a bearing surface 72.

The resilient material forming the body 12 and shoulders 66 permit the hole 60 in the body 12 and shoulder 66 to expand to receive the tube 62 with sleeve 70. The tube 62 with sleeve 70 is inserted through the hole 60 or extend through the openings 60, 60' such that one end of the tube extends or is visible from the third opening 60 and the second end of the tube extends or is visible from the fourth opening 60'. The sleeve 70 is located inside the cavity 28 of the body 12 such that the bearing surface 68 of one of the shoulders 66 contacts one of the bearing surfaces 72 of the sleeve and the bearing surface 68 of the other shoulder 66 contacts the bearing surface 72 on the other side of the sleeve. The contact between the bearing surfaces 68, 72 forms a seal to prevent water from entering the cavity 28 when the bait 10 is used in water and to hold the tube 62 in the body 12.

The sleeve 70 can be further held in position inside the cavity 28 between the pair of shoulders 66 by fixing the sleeve to the interior surface of the body 12 forming the cavity. In one embodiment, the sleeve 70 is siliconed to the interior surface of the body 12. However, other means of fixing the sleeve 70 to the body 12 is known in the industry, including, epoxying, gluing, ultra or sonic binding, friction, welding, snap-fit, integrally forming the sleeve with the body, etc., the use of which would not defeat the spirit of the invention.

The sleeve 70 provides protection to the tube 62. When a fish strikes or bites the bait 10, the fish will bite onto the hook(s) 14. The force may cause the tips or points 38 of the hook to rotate upwards and causing the hook to contact the sleeve 70. In one embodiment, the tube is made from glass. If the sleeve 70 were not present, the hook 14 would contact the tube 62 and could break the tube. The hook 14 can contact the sleeve 70 without breaking the tube.

The bait 10 may also include other accessories. For example, as seen in FIG. 3, the rear of the body 12 includes holes for attaching one or more skirts 74. The skirts 74 move in the water and when being retrieved and/or walked to look like legs of a frog to a fish. Different types of legs, skirts, hooks, etc. could be attached to the bait without defeating the spirit of the invention.

Figure 9:
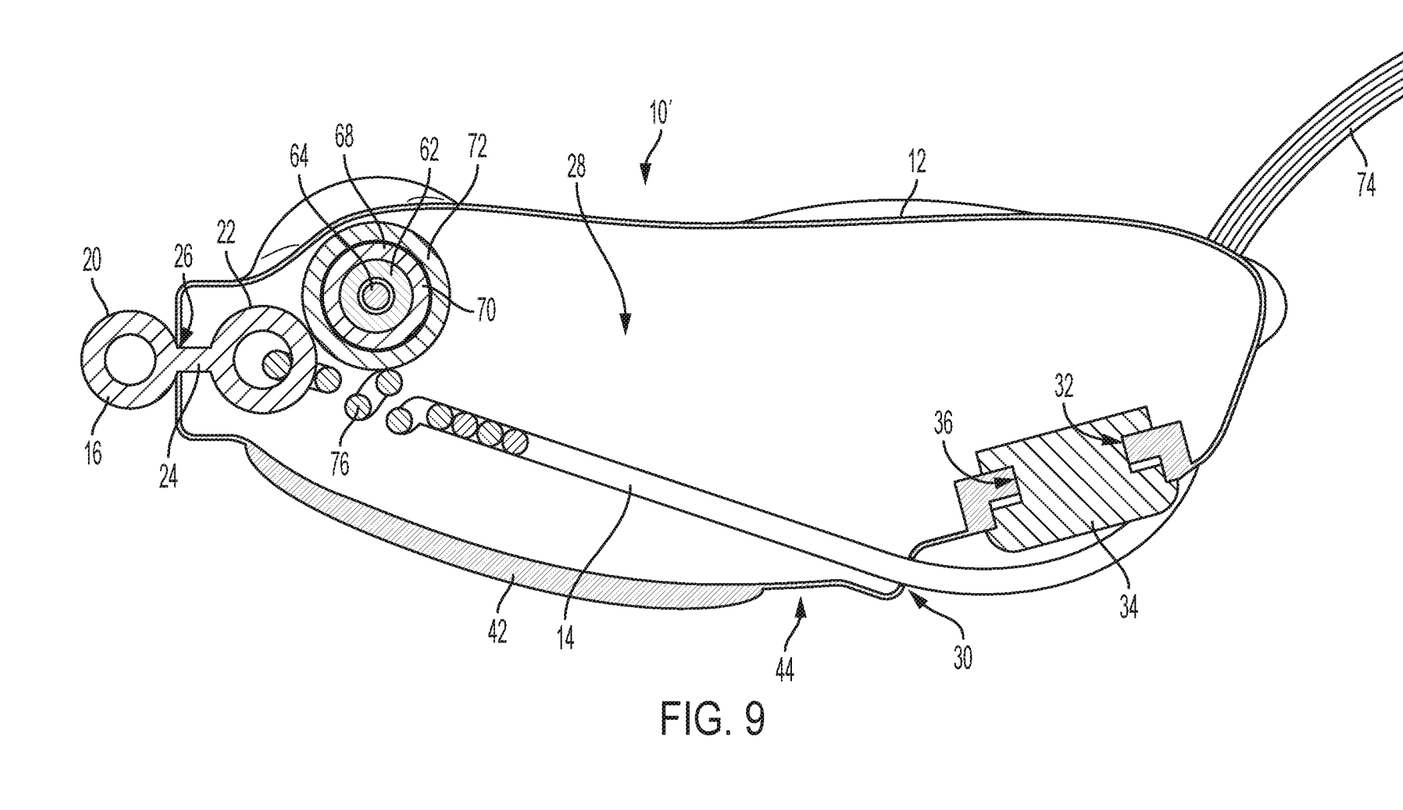
FIG. 9 is a side cross-sectional view of an alternative embodiment of a bait.

In another embodiment seen in FIG. 9, the bait 10' has a resilient member 76 between the hook 14 and the eyelet 16. In the embodiment seen in FIG. 9, the resilient member 76 is a spring, however other resilient members are known in the industry, for example, rubber or plastic bands, pneumatic cylinders, etc., the use of which would not defeat the spirit of the invention. Alternatively, the eyelet 16 could be made from a resilient material such as rubber or plastic.

When a fish strikes the bait 10', the resilient member 76 can expand to allow the fish to get a better hold on the hook 14 before a fisherman or woman jerks the rod up causing the line to pull the bait and hook away from the fish and to engage the hook in the fish's mouth. Permitting the hook 14 to be pulled out away from the body 12 creates a hook gap, the distance between the tip 38 of the hook 14 and the body 12, which can be helpful in hooking the fish. The hook 14 being able to be pulled out away from the body 12 also creates a delayed reaction between the time the fisherman or woman pulls the rod and line away from the fish and when the hook starts to move which creates additional momentum improving hook penetration in a fish's mouth.

Figure 10:
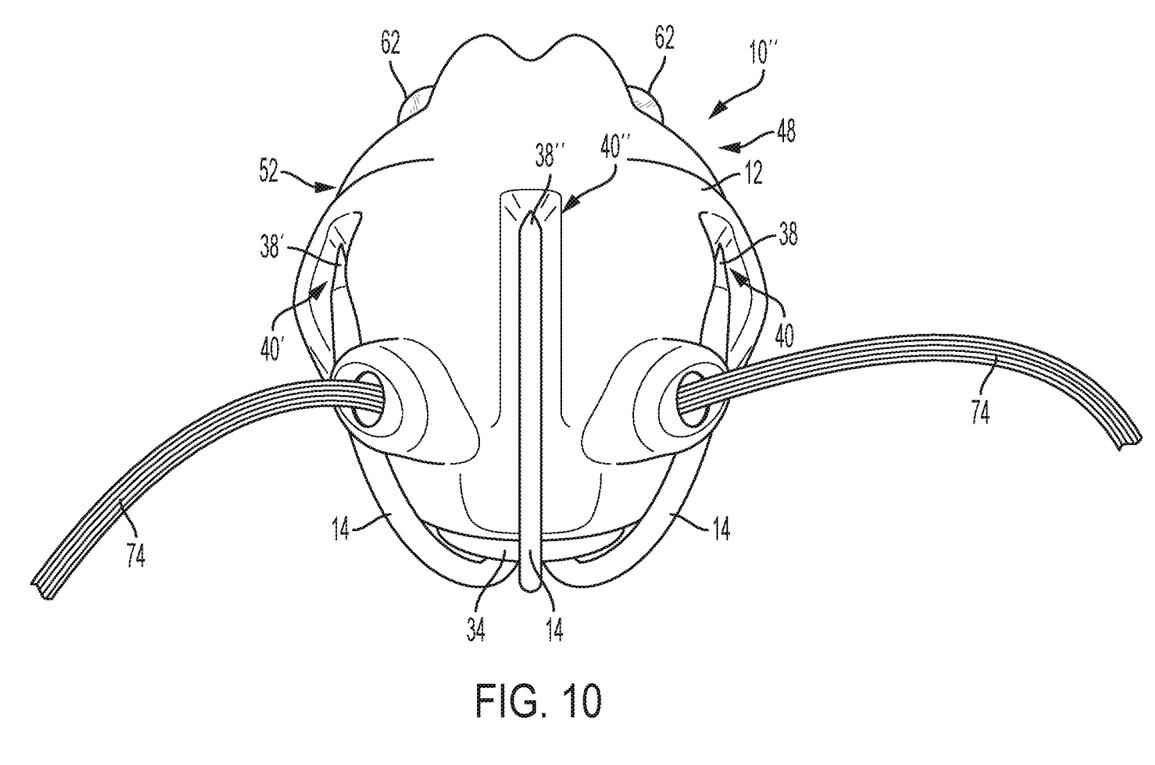
FIG. 10 is a rear perspective view of an alternative embodiment of a bait.

In another embodiment seen in FIG. 10, the bait 10" has a third pocket 40" located on the top surface of the body 12. The hook 14 has a third point 38" located in the third pocket 40". The addition of a third pocket 40" and third point 38" increases the ability for one of the points to engage a fish's mouth, e.g. if the fish strikes from behind and above the bait 10'.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An artificial fishing bait comprising:
   a hollow member;
   a hook attached to the hollow member; and
   a line tie attached to the hollow member;
   at least one keel located on the bottom of said hollow member;
   wherein the at least one keel is arranged to form first and second pathways which promote a zig-zag effect during retrieval of said fishing bait.

2. The artificial fishing bait of claim 1, further comprising:
   a second keel on the exterior surface of the hollow member; and
   a third keel on the exterior surface of the hollow member;
   wherein the first pathway is located between the at least one keel and the second keel and the second pathway is located between the at least one keel and the third keel.

3. The artificial fishing bait of claim 2, wherein the first keel, second keel and third keel each have an end located adjacent to a front of the hollow member.

4. The artificial fishing bait of claim 3 wherein the first keel, second keel and third keel are integrally formed in the hollow member.

5. The artificial fishing bait of claim 4, wherein the hollow member has a first opening configured to attach the line tie to the hollow member.

6. The artificial fishing bait of claim 5, wherein the hollow member has a second opening configured to attach a weight to the bottom side of the hollow member.

7. The artificial fishing bait of claim 6, wherein the hollow member has a third opening on the first side of the hollow member and a fourth hole on the second side of the hollow member;
   wherein a tube extends through the third opening and forth opening such that one end of the tube is visible from the third opening and a second end of the tube is visible from the fourth opening; and
   wherein at least one ball is located in the tube and is configured to create a noise and vibration when the at least one ball contacts the tube.

8. The artificial fishing bait of claim 7, wherein the tube is made from a material that permits light through the material; and wherein the at least one ball is visible through the tube when the at least one ball is located adjacent to one of the first end and second end.

9. The artificial fishing bait of claim 1, wherein the hollow member forms a hollow space;
   wherein a first end of the hook is located in the hollow space; and
   wherein a point of the hook is located outside the hollow space and adjacent a top side of the hollow member.

10. The artificial fishing bait of claim 9, wherein a portion of the hook extends out of the hollow space through an opening in the bottom side of the hollow member.

* * * * *